US007863969B2

(12) United States Patent
Furuya et al.

(10) Patent No.: US 7,863,969 B2
(45) Date of Patent: Jan. 4, 2011

(54) POWER SUPPLY VOLTAGE DROPPING CIRCUIT USING AN N-CHANNEL TRANSISTOR OUTPUT STAGE

(75) Inventors: Ryohei Furuya, Tokyo (JP); Yoji Idei, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

(21) Appl. No.: 12/435,780

(22) Filed: May 5, 2009

(65) Prior Publication Data

US 2009/0284309 A1 Nov. 19, 2009

(30) Foreign Application Priority Data

May 15, 2008 (JP) ............................ 2008-128587

(51) Int. Cl.
*G05F 1/563* (2006.01)
*H02M 3/00* (2006.01)

(52) U.S. Cl. ...................... 327/541; 327/537; 327/543; 323/266; 323/311

(58) Field of Classification Search ...................... None
See application file for complete search history.

(56) References Cited

U.S. PATENT DOCUMENTS 6,115,272 A * 9/2000 Pasternak .................... 363/60
6,442,079 B2 * 8/2002 Lee et al. ............... 365/189.09
6,600,299 B2 * 7/2003 Xi .............................. 323/280
7,061,481 B2 * 6/2006 Tsuchiya .................... 345/211
7,113,026 B2 * 9/2006 Yamahira .................... 327/540
7,279,961 B2 * 10/2007 Chan et al. .................. 327/540
7,312,649 B2 * 12/2007 Origasa et al. ............. 327/536
7,706,160 B2 * 4/2010 Fontana et al. ................ 363/59

FOREIGN PATENT DOCUMENTS

JP 2000-148263 5/2000
JP 2006-031158 2/2006

* cited by examiner

*Primary Examiner*—Lincoln Donovan
*Assistant Examiner*—Terry L Englund
(74) *Attorney, Agent, or Firm*—McDermott Will & Emery LLP

(57) ABSTRACT

A device includes an N-channel transistor for output, a voltage raising circuit, a voltage dropping circuit, and an amplifier. A power supply voltage that is a first voltage is supplied to one end of the output N-channel transistor, and the other end of the output N-channel transistor functions as an output terminal. The voltage raising circuit raises the first voltage to generate a second voltage higher than the first voltage. The voltage dropping circuit reduces the second voltage to generate a third voltage that is higher than the first voltage and is lower than the second voltage. The amplifier amplifies the difference between a reference voltage and a voltage generated at the output terminal, using the third voltage as a power supply voltage, to generate a fourth voltage, and supplies the fourth voltage to the gate of the N-channel transistor for output.

20 Claims, 6 Drawing Sheets

POWER SUPPLY VOLTAGE DROPPING CIRCUIT USING AN N-CHANNEL TRANSISTOR OUTPUT STAGE

BACKGROUND OF THE INVENTION

1. Field of the Invention

The present invention relates to a power supply voltage dropping circuit, a semiconductor device, a power supply voltage circuit, a power supply voltage dropping method, and a power supply voltage outputting method, and particularly to a power supply voltage dropping circuit in which an Nch (N-channel) transistor is used as the output stage, a semiconductor device, a power supply voltage circuit, a power supply voltage dropping method, and a power supply voltage outputting method.

2. Description of Related Art

In semiconductor devices, a voltage dropping circuit that reduces the external power supply voltage to generate an internal power supply voltage is known. The internal power supply voltage is supplied to a semiconductor element which is driven by a voltage lower than the external power supply voltage.

Japanese Patent Laid-Open No. 2000-148263 describes a voltage dropping circuit in which the output stage is a Pch (P-channel) transistor.

FIG. 1 is a circuit diagram showing a voltage dropping circuit in which the output stage is a Pch transistor. In FIG. 1, voltage dropping circuit 100 includes Pch transistor 101 and amplifier 102.

External power supply voltage VDD is supplied to the source of Pch transistor 101. The output of amplifier 102 is supplied to the gate of Pch transistor 101. The drain of Pch transistor 101 outputs voltage VOUT that is lowered in external power supply voltage VDD according to the output of amplifier 102.

Amplifier 102 amplifies the difference between reference voltage VREF and a voltage generated at the drain of Pch transistor 101, using external power supply voltage VDD as a power supply voltage, to generate a control voltage. Amplifier 102 supplies the control voltage to the gate of Pch transistor 101.

Therefore, in voltage dropping circuit 100, control such that the voltage generated at the drain of Pch transistor 101 is maintained at reference voltage VREF is performed.

Also, in recent years, due to lower voltages of semiconductor devices, external power supply voltage VDD has decreased from 1.8 V to 1.4 V, 1.2 V, and 1.0 V.

In the voltage dropping circuit in which the output stage is a Pch transistor, when external power supply voltage VDD decreases, Vgs (the voltage between the source and the gate) and Vds (the voltage between the source and the drain) of the Pch transistor both decrease. Thus, the driving ability of the Pch transistor that is the output stage decreases.

There is a voltage dropping circuit in which an Nch transistor is used as the output stage to reduce the decrease in driving ability (see Japanese Patent Laid-Open No. 2000-148263 and Japanese Patent Laid-Open No. 2006-31158).

In this voltage dropping circuit, the Nch transistor is used as the output stage, so that increased power supply voltage VPP that is obtained by increasing external power supply voltage VDD should be used as the power supply of the amplifier.

FIG. 2 is a circuit diagram showing a voltage dropping circuit in which the output stage is an Nch transistor. In FIG. 2, voltage dropping circuit 200 includes Nch transistor 201, amplifier 202, and voltage raising circuit 203.

External power supply voltage VDD is supplied to the drain of Nch transistor 201. The output of amplifier 202 is supplied to the gate of Nch transistor 201. The source of Nch transistor 201 outputs voltage VOUT that is lowered in external power supply voltage VDD according to the output of amplifier 202.

Voltage raising circuit 203 raises external power supply voltage VDD to generate voltage VPP. For example, voltage raising circuit 203 includes a charge pump and the like.

Amplifier 202 amplifies the difference between reference voltage VREF and the voltage generated at the source of Nch transistor 201, using voltage VPP as a power supply voltage, to generate a control voltage. Amplifier 202 supplies the control voltage to the gate of Nch transistor 201.

Therefore, in voltage dropping circuit 200, control such that the voltage generated at the source of Nch transistor 201 is maintained at reference voltage VREF is performed.

The voltage dropping circuit in which the output stage is an Nch transistor raises external power supply voltage VDD, so that the voltage dropping circuit requires a voltage raising circuit.

The voltage raising circuit raises the voltage step by step, so that due to its characteristics, the voltage raising circuit easily generates noise during voltage raising. Thus, it is more likely that noise generated during voltage raising is included in the raised power supply voltage output from the voltage raising circuit.

Therefore, the amplifier in the voltage dropping circuit in which the output stage is an Nch transistor is easily affected by the noise included in the raised power supply voltage. Thus, there has been a problem in which the voltage dropping circuit in which the output stage is an Nch transistor is affected by the noise included in the raised power supply voltage.

SUMMARY

The present invention seeks to solve one or more the above problems, or to improve upon those problems at least in part.

In one embodiment, there is provided a device that includes an N-channel transistor for output, a voltage raising circuit, a voltage dropping circuit, and an amplifier. A power supply voltage that is a first voltage is supplied to one end of the N-channel transistor for output, and the other end of the N-channel transistor for output functions as an output terminal. The voltage raising circuit raises the first voltage to generate a second voltage higher than the first voltage. The voltage dropping circuit reduces the second voltage to generate a third voltage that is higher than the first voltage and that is lower than the second voltage. The amplifier amplifies the difference between a reference voltage and a voltage generated at the output terminal, using the third voltage as a power supply voltage, to generate a fourth voltage, and supplies the fourth voltage to the gate of the output N-channel transistor.

BRIEF DESCRIPTION OF THE DRAWINGS

The above feature and advantages of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
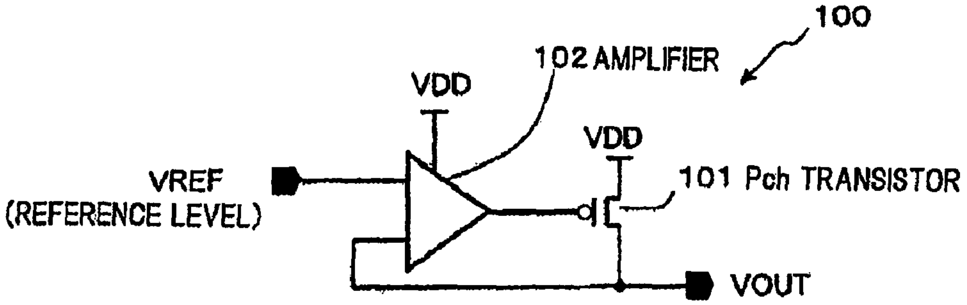
Fig. 1 Prior Art
FIG. 1 is a circuit diagram showing a voltage dropping circuit in which the output stage is a Pch transistor.
Figure 2:
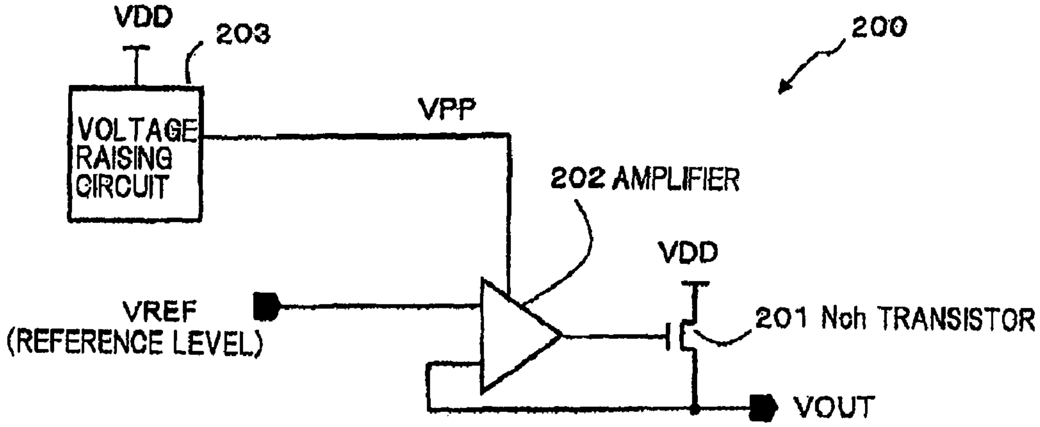
Fig.2 Prior Art
FIG. 2 is a circuit diagram showing a voltage dropping circuit in which the output stage is an Nch transistor.
Figure 3:
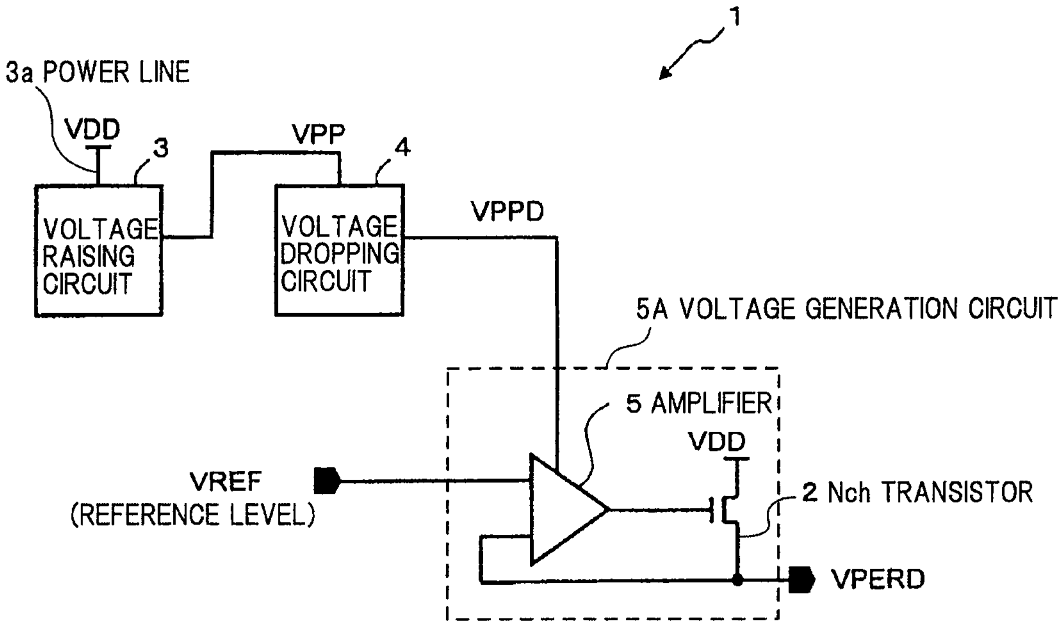
FIG. 3 is a circuit diagram showing a power supply voltage dropping circuit in the first embodiment of the present invention.

Referring now to FIG. 3, power supply voltage dropping circuit 1 according to a first embodiment of the present invention includes Nch transistor 2, voltage raising circuit 3, voltage dropping circuit 4, and amplifier (amplification circuit) 5. Voltage raising circuit 3 and voltage dropping circuit 4 are included in a power supply voltage circuit. Nch transistor 2 and amplifier 5 are included in voltage generation circuit 5A.

A device comprises power supply voltage dropping circuit 1. Power supply voltage dropping circuit 1 can be called a device.

Power supply voltage dropping circuit 1 reduces the external power supply voltage VDD to generate and output internal power supply voltage VPERD. External power supply voltage VDD can be generally referred to as a power supply voltage that is a first voltage. Internal power supply voltage VPERD is used, for example, as an internal reduced power supply voltage for the DLL (Delay Locked Loop) circuit of a DRAM (Dynamic Random Access Memory).

Nch transistor (a first transistor of a first conductivity type) 2 can be generally referred to as an Nch transistor for output.

External power supply voltage VDD is supplied to the drain of Nch transistor 2. The source of Nch transistor 2 functions as an output terminal that is an output node. An output voltage is generated at the source of Nch transistor 2. The drain of Nch transistor 2 can be generally referred to as one end of Nch transistor 2. The source of Nch transistor 2 can be generally referred to as the other end of Nch transistor 2.

Power line 3*a* is supplied with external power supply voltage VDD.

Voltage raising circuit (voltage step-up circuit) 3 raises external power supply voltage VDD, which is supplied from power line 3*a*, to generate raised-power supply voltage VPP. Raised power supply voltage VPP can be generally referred to as a second voltage. Voltage raising circuit 3 raises the voltage step by step, so that because of its characteristics, voltage raising circuit 3 easily generates noise during voltage raising.

The configuration of voltage raising circuit 3 is not particularly limited.

For example, voltage raising circuit 3 includes a comparator to which reference voltage VREF is input and which constitutes a feedback loop, a ring oscillator, a charge pump, and two resistors connected in series.

In this case, the comparator compares voltage VPP2 obtained by dividing raised power supply voltage VPP generated by the charge pump by the two resistors, and reference voltage VREF. When VPP2>VREF, the comparator outputs an H level as an enable signal. When VPP2<VREF, the comparator outputs an L level.

The ring oscillator includes a clock oscillation circuit. When the enable signal is the H level, the ring oscillator supplies a clock signal to the charge pump. When the enable signal is the L level, the ring oscillator stops oscillation in order to stop the supply of the clock signal.

The charge pump performs double voltage rectification, based on the clock signal, and outputs raised power supply voltage VPP.

In this voltage raising circuit, when raised power supply voltage VPP is higher than a predetermined voltage, the oscillation of the ring oscillator stops, so that raised power supply voltage VPP decreases gradually. Also, when raised power supply voltage VPP is lower than the predetermined voltage, the oscillation of the ring oscillator restarts, so that raised power supply voltage VPP rises gradually. Raised power supply voltage VPP is maintained at the predetermined voltage in this manner.

In this voltage raising circuit, with the start and stop of the oscillation of the ring oscillator, or the start and stop of operation of the charge pump, noise can occur.

Voltage dropping circuit (voltage step-down circuit) 4 reduces raised power supply voltage VPP to generate reduced power supply voltage VPPD. Reduced power supply voltage VPPD can be generally referred to as a third voltage.

Voltage generation circuit 5A is supplied with external power supply voltage VDD and reduced power supply voltage VPPD to generate an output voltage at the output node.

Amplifier (first amplifier) 5 is, for example, a differential amplification circuit. In amplifier 5, reference voltage VREF is supplied to the non-inverting input terminal, and a voltage generated at the source of Nch transistor 2 is supplied to the inverting input terminal.

Amplifier 5 amplifies the difference between reference voltage VREF and the voltage generated at the source of Nch transistor 2, using reduced power supply voltage VPPD as a power supply voltage, to generate a control voltage. Amplifier 5 supplies the control voltage to the gate of Nch transistor 2. The control voltage can be generally referred to as a fourth voltage.

Next, the operation is described.

Voltage raising circuit 3 raises, for example, an external power supply voltage VDD of 1.5 V, to generate, for example, a raised power supply voltage VPP of 2.7 V. Noise due to the voltage raising operation can be included in raised power supply voltage VPP.

Voltage dropping circuit 4 reduces the raised power supply voltage VPP of 2.7 V to generate, for example, a reduced power supply voltage VPPD of 2.4 V. The voltage dropping circuit 4 that reduces raised power supply voltage VPP to reduced power supply voltage VPPD decreases the noise included in raised power supply voltage VPP.

If voltage dropping circuit 4 reduces raised power supply voltage VPP too much, the driving force of Nch transistor 2 that is the output stage will decrease. Therefore, in this embodiment, the voltage drop from raised power supply voltage VPP to reduced power supply voltage VPPD is 0.3 V.

Amplifier 5 uses reduced power supply voltage VPPD as a power supply voltage.

Therefore, using, for example, reference voltage VREF of 1.0 V as a reference potential, power supply voltage dropping circuit 1 in which the output stage is Nch transistor 2 reduces the external power supply voltage VDD of 1.5 V and outputs an internal power supply voltage VPERD of 1.0 V from the source of Nch transistor 2.

According to this embodiment, in the power supply voltage dropping circuit in which the output stage is an Nch transistor, the voltage obtained by raising the external power supply voltage by means of voltage raising circuit 3 and then by reducing the raised power supply voltage by means of voltage dropping circuit 4 is used as the power supply voltage of amplifier 5.

Therefore, the noise generated in voltage raising circuit 3 is reduced by voltage dropping circuit 4, using the characteristics of the voltage dropping circuit. Thus, it is possible to reduce the effect of the noise generated in voltage raising circuit 3 on the operation of amplifier 5. Therefore, it is possible to supply internal power supply voltage VPERD that is not easily affected by the noise generated in voltage raising circuit 3.

Also, external power supply voltage VDD is not used as the power supply voltage of amplifier 5, so that it is possible to supply internal power supply voltage VPERD that is not easily affected by the noise generated in external power supply voltage VDD.

In this embodiment, reduced power supply voltage VPPD obtained by raising external power supply voltage VDD by means of voltage raising circuit 3 and reducing raised power supply voltage VPP by means of voltage dropping circuit 4 is supplied to amplifier 5 to generate the control voltage of Nch transistor 2. But, reduced power supply voltage VPPD is not limited to the power supply of the amplifier for generating a control voltage for generating a reduced power supply voltage and can be used as power supplies for various applications.

Second Embodiment

Figure 4:
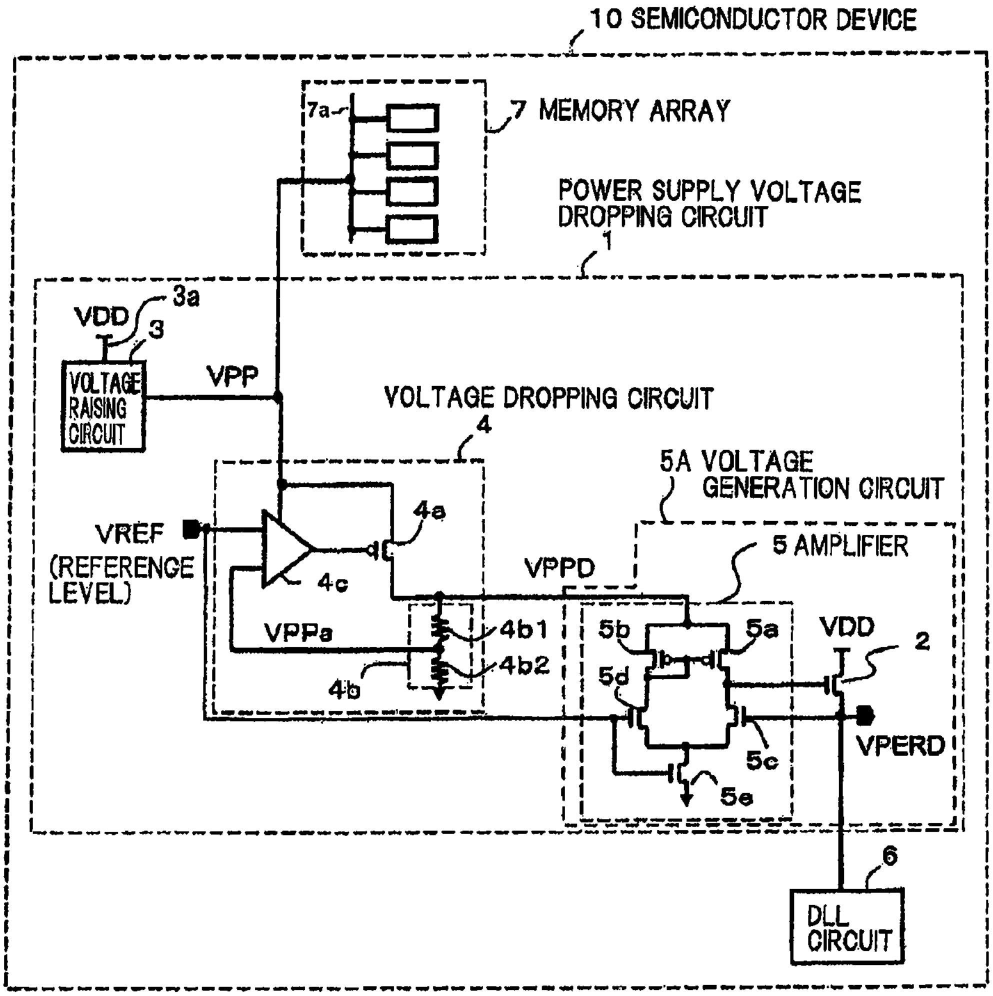
FIG. 4 is a circuit diagram showing a semiconductor device having a power supply voltage dropping circuit in the second embodiment of the present invention.

FIG. 4 is a circuit diagram showing a device having a power supply voltage dropping circuit according to the second embodiment of the present invention. In FIG. 4, the same parts as those shown in FIG. 3 are referred to by the same characters. The device shown in FIG. 4 will be described below, focusing on points different from the first embodiment shown in FIG. 3.

In FIG. 4, semiconductor device 10 includes power supply voltage dropping circuit 1, DLL circuit 6, and memory array 7. Voltage dropping circuit 4 includes Pch transistor (a second transistor of a second conductivity type) 4*a*, generation circuit 4*b*, and amplifier (second amplifier) 4*c*. Amplifier 5 includes a pair of Pch transistors 5*a* and 5*b*, a pair of Nch transistors 5*c* and 5*d*, and constant current circuit 5*e*. Nch transistor 5*d* can be called a first pair transistor of the first conductivity type. Nch transistor 5*c* can be called a second pair transistor of the first conductivity type. Pch transistor 5*b* can be called a third pair transistor of the second conductivity type. Pch transistor 5*a* can be called a fourth pair transistor of the second conductivity type.

Pch transistor 4*a* can be generally referred to as a voltage dropping Pch transistor.

Raised power supply voltage VPP is supplied to the source of Pch transistor 4*a*. The drain of Pch transistor 4*a* (supply node) outputs reduced power supply voltage VPPD. The source of Pch transistor 4*a* can be generally referred to as one end of Pch transistor 4*a*. The drain of Pch transistor 4*a* can be generally referred to as the other end of Pch transistor 4*a*.

Generation circuit 4*b* divides reduced power supply voltage VPPD to generate voltage VPPa. Generation circuit 4*b* includes resistors 4*b*1 and 4*b*2 connected in series. Reduced power supply voltage VPPD is divided by resistors 4*b*1 and 4*b*2, and voltage VPPa is generated. Voltage VPPa can be generally referred to as a fifth voltage.

Amplifier 4*c* can be generally referred to as a voltage dropping amplification circuit.

Amplifier 4*c* amplifies the difference between reference voltage VREF and voltage VPPa, using raised power supply voltage VPP as a power supply voltage, to generate an adjustment voltage. Amplifier 4*c* supplies the adjustment voltage to the gate of Pch transistor 4*a*. The adjustment voltage can be generally referred to as a sixth voltage.

Pch transistors 5*a* and 5*b* constitute a current mirror circuit.

Reduced power supply voltage VPPD is supplied to the respective sources of Pch transistors 5*a* and 5*b*. The respective sources of Pch transistors 5*a* and 5*b* can be generally referred to as respective one ends of Pch transistors 5*a* and 5*b*.

The respective drains of Pch transistors 5*a* and 5*b* are individually connected to the respective drains of Nch transistors 5*c* and 5*d*. The respective drains of Pch transistors 5*a* and 5*b* can be generally referred to as respective other ends of Pch transistors 5*a* and 5*b*. The respective drains of Nch transistors 5*c* and 5*d* can be generally referred to as respective one ends of Nch transistors 5*c* and 5*d*.

The drain of Pch transistor 5*a* is connected to the gate of Nch transistor 2.

The gate of Nch transistor 5*c* is connected to the source of Nch transistor 2. Reference voltage VREF is supplied to the gate of Nch transistor 5*d*.

The respective sources of Nch transistors 5*c* and 5*d* are connected to constant current circuit 5*e*. The respective sources of Nch transistors 5*c* and 5*d* can be generally referred to as respective other ends of Nch transistors 5*c* and 5*d*.

The respective gates of Pch transistors 5*a* and 5*b* are connected to the drain of Pch transistor 5*b*.

DLL circuit 6 can be generally referred to as a load circuit.

DLL circuit 6 controls the time difference between the external clock and the internal clock in a DRAM, using, as a power supply voltage, internal power supply voltage VPERD supplied from the output terminal of Nch transistor 2. The power supply voltage used in DLL circuit 6 is used for minute adjustment of the DLL clock. Therefore, DLL circuit 6 particularly requires a stable power supply voltage.

Memory array 7 uses raised power supply voltage VPP as the raised power supply voltage of word line 7*a*.

According to this embodiment, voltage dropping circuit 4 reduces raised power supply voltage VPP to reduced power supply voltage VPPD. Therefore, the noise in raised power supply voltage VPP can be reduced by the characteristics of voltage dropping circuit 4. Thus, the power supply voltage of amplifier 5 is stable, and internal power supply voltage VPERD is stable. Therefore, stable internal power supply voltage VPERD can be supplied to DLL circuit 6.

Raised power supply voltage VPP is supplied to word line 7*a* of memory array 7, so that noise due to the operation of memory array 7 can be included in raised power supply voltage VPP. However, voltage dropping circuit 4 decreases this noise, so that it is possible to generate internal power supply voltage VPERD that is not easily affected by this noise.

In this embodiment, amplifier 4*c* and amplifier 5 use common reference voltage VREF. Therefore, it is not necessary to generate a different reference voltage.

In this embodiment, the output stage of voltage dropping circuit 4 is a Pch transistor, and raised power supply voltage VPP obtained by raising external power supply voltage VDD is used as the power supply voltage of Pch transistor 4*a*. Therefore, the driving force of Pch transistor 4*a* is not a problem.

Also, the output stage of voltage dropping circuit 4 can be changed from the Pch transistor to an Nch transistor. In this case, apart from raised power supply voltage VPP, a raised power supply voltage raised from raised power supply voltage VPP by the threshold of the Nch transistor is necessary.

Also, in this embodiment, internal power supply voltage VPERD is used as the power supply voltage of the DLL circuit for the DRAM, but the load circuit to which internal power supply voltage VPERD is supplied is not limited to the DLL circuit for the DRAM and can be appropriately changed.

Also, the DRAM is considered as semiconductor device 10 in which power supply voltage dropping circuit 1 is mounted, but power supply voltage dropping circuit 1 may be mounted in a semiconductor device other than the DRAM.

Third Embodiment

Figure 5:
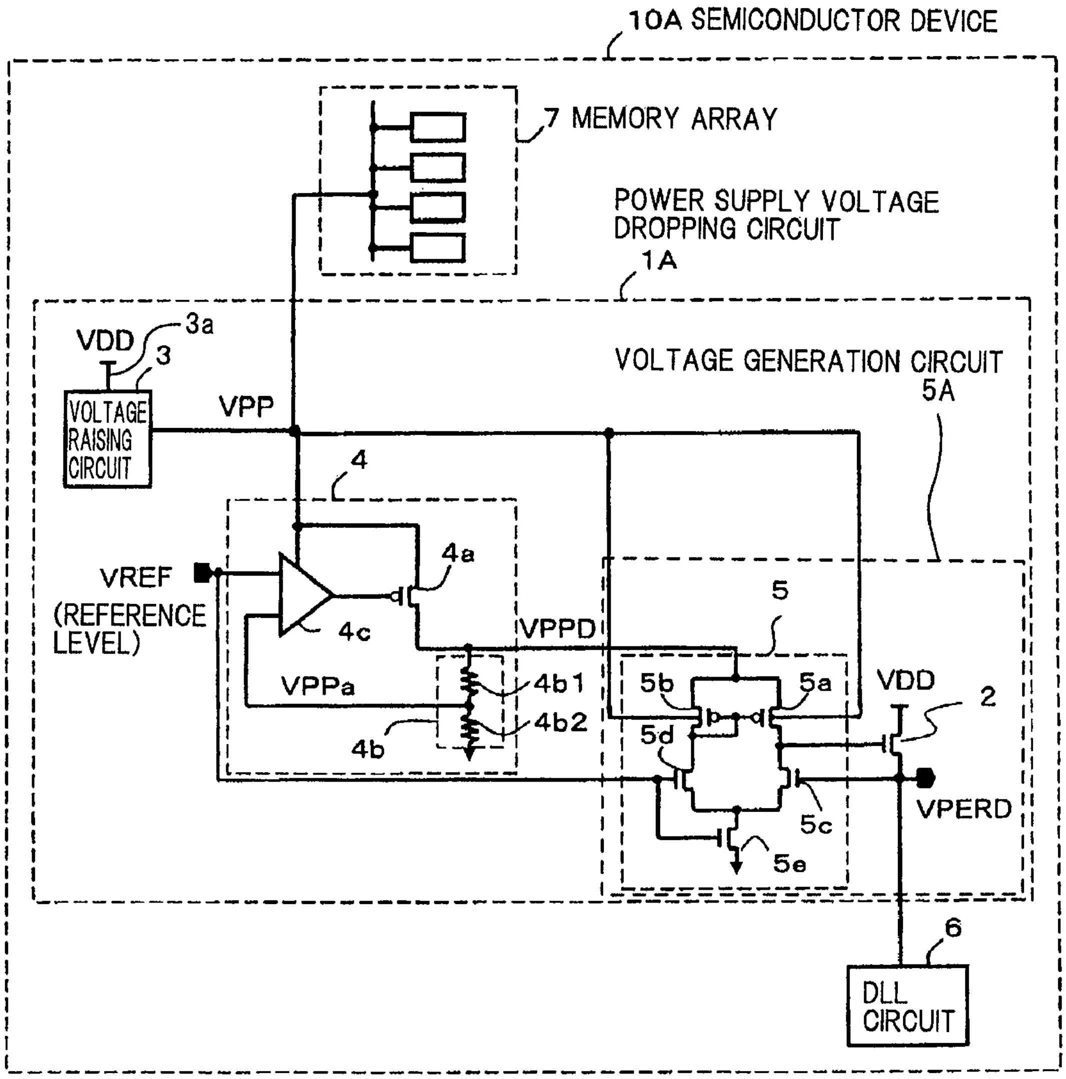
FIG. 5 is a circuit diagram showing a semiconductor device having a power supply voltage dropping circuit in the third embodiment of the present invention.

FIG. 5 is a circuit diagram showing a semiconductor device having a power supply voltage dropping circuit according to the third embodiment of the present invention. In FIG. 5, the same parts as those shown in FIG. 4 are referred to by the same characters.

The semiconductor device shown in FIG. 5 will be described below, focusing on points that are different from the second embodiment shown in FIG. 4.

Power supply voltage dropping circuit 1A in the third embodiment is different from power supply voltage dropping circuit 1 in the second embodiment in that raised power supply voltage VPP is supplied as a back bias to Pch transistors 5*a* and 5*b* of amplifier 5.

Figure 6:
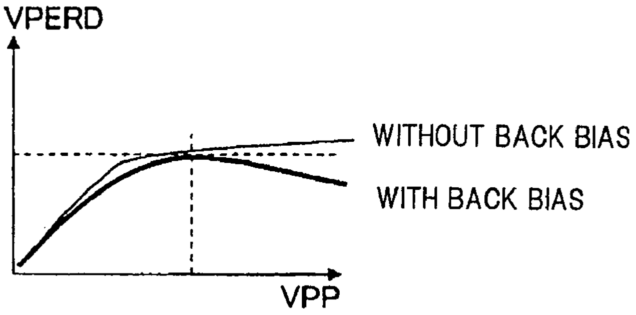
FIG. 6 is an explanatory diagram showing the result of simulating the relationship between external power supply voltage VPP and internal power supply voltage VPERD.

FIG. 6 is an explanatory diagram showing the result of simulating the relationship between external power supply voltage VPP and internal power supply voltage VPERD.

This simulation is performed with the value of target internal power supply voltage VPERD being 1.0 V, under the condition that when external power supply voltage VPP is 2.7 V, internal power supply voltage VPERD is saturated.

Without the use of a back bias, even if raised power supply voltage VPP exceeds 2.7 V, internal power supply voltage VPERD increases. On the other hand, with the use of a back bias, when raised power supply voltage VPP is 2.7 V, internal power supply voltage VPERD is saturated, and as raised power supply voltage VPP becomes higher than 2.7 V, internal power supply voltage VPERD decreases. In other words, when raised power supply voltage VPP is about 2.7 V, the derivative of the change in internal power supply voltage VPERD is 0.

Therefore, by adjusting each voltage so that internal power supply voltage VPERD is saturated according to the target condition, fluctuations in internal power supply voltage VPERD can be suppressed, and stable internal power supply voltage VPERD can be output.

In this embodiment, raised power supply voltage VPP is used as a back bias power supply voltage, and reduced power supply voltage VPPD is used as the power supply voltage of amplifier 5. However, to prevent the back bias from being affected by the noise in the raised power supply voltage, power supply voltage VPPS separately obtained by dropping raised power supply voltage VPP may be used as a back bias power supply voltage. At this time, the voltage of back bias power supply voltage VPPS should be higher than reduced power supply voltage VPPD that is the power supply voltage of amplifier 5.

Next, the effect of the back bias will be described.

Figure 7:
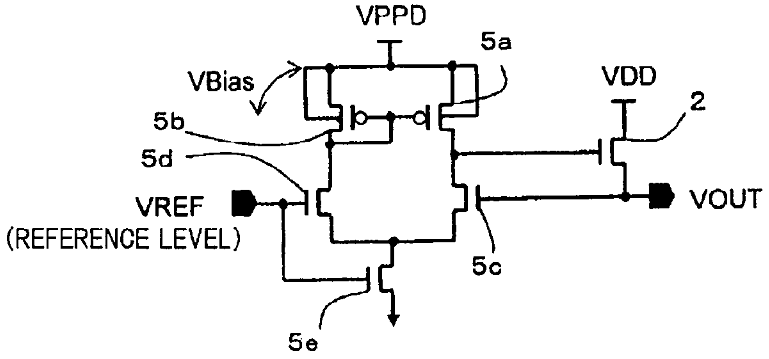
FIG. 7 is a circuit diagram showing Nch transistor 2 and amplifier 5 in power supply voltage dropping circuit 1A.

FIG. 7 is a circuit diagram showing Nch transistor 2 and amplifier 5 in power supply voltage dropping circuit 1A. In FIG. 7, reduced power supply voltage VPPD that is the power supply voltage of amplifier 5 is supplied as a back bias to Pch transistors 5*a* and 5*b* of amplifier 5. In this case, in Pch transistors 5*a* and 5*b*, potential difference Vbias between the source and the back bias is always 0 V.

Figure 8:
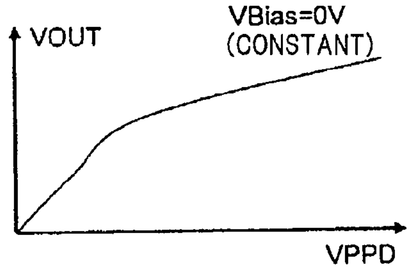
FIG. 8 is an explanatory diagram showing the result of simulating the relationship between reduced power supply voltage VPPD and voltage VOUT generated at the source of Nch transistor 2.

FIG. 8 is an explanatory diagram showing the result of simulating the relationship between reduced power supply voltage VPPD and voltage VOUT generated at the source of Nch transistor 2.

As shown in FIG. 8, potential difference Vbias is 0 V, so that as reduced power supply voltage VPPD rises, Vds (source-drain voltage) of Pch transistors 5*a* and 5*b* increases, and with the rise in reduced power supply voltage VPPD, voltage VOUT also increases.

Figure 9:
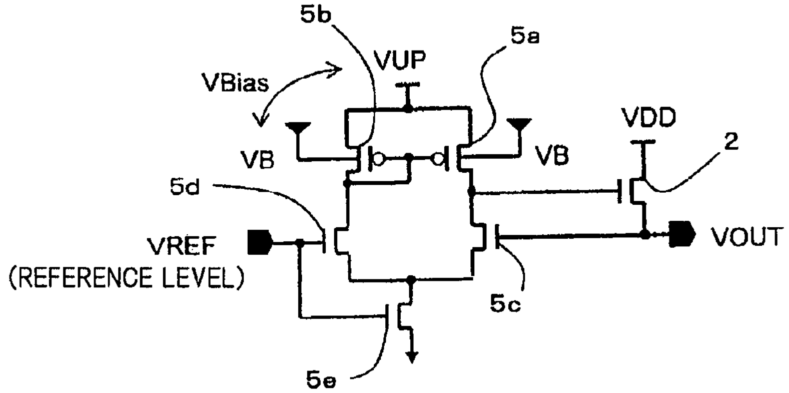
FIG. 9 is a circuit diagram showing Nch transistor 2 and amplifier 5 in power supply voltage dropping circuit 1A.

FIG. 9 is a circuit diagram showing Nch transistor 2 and amplifier 5 in power supply voltage dropping circuit 1A. In FIG. 9, the power supply voltage of amplifier 5 (a voltage supplied to the respective sources of Pch transistors 5*a* and 5*b*) is voltage VUP (constant reduced power supply voltage VPPD), and the back bias of Pch transistors 5*a* and 5*b* is changed.

Figure 10:
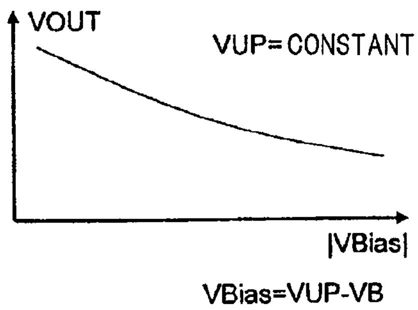
FIG. 10 is an explanatory diagram showing the result of simulating the relationship between potential difference Vbias and voltage VOUT.

FIG. 10 is an explanatory diagram showing the result of simulating the relationship between potential difference Vbias and voltage VOUT.

As shown in FIG. 10, as potential difference Vbias increases, threshold voltage Vt of Pch transistors 5*a* and 5*b* increases, and voltage VOUT decreases.

From these results, it is seen that as the power supply voltage of amplifier 5 rises, output voltage VOUT increases, and as the back bias increases, output voltage VOUT decreases.

By adjusting the power supply voltage of amplifier 5 and the voltage of the back bias, the saturation characteristics of voltage VOUT are obtained, and a condition in which saturation will occur at target voltage VOUT can be set. Thus, it is possible to implement power supply voltage dropping circuit 1A that further suppresses fluctuations in voltage VOUT.

Fourth Embodiment

Figure 11:
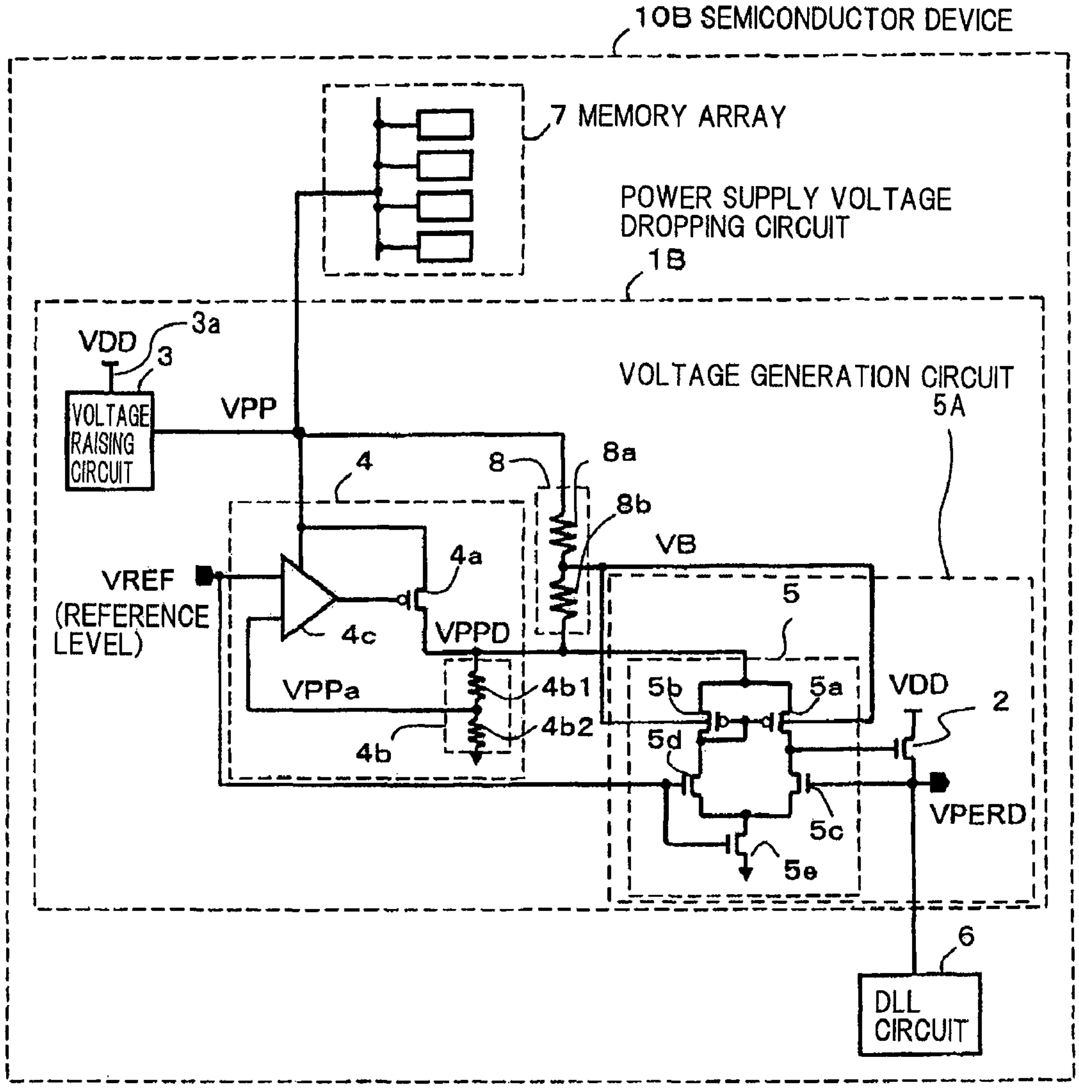
FIG. 11 is a circuit diagram showing a semiconductor device having a power supply voltage dropping circuit in the fourth embodiment of the present invention.

FIG. 11 is a circuit diagram showing a semiconductor device having a power supply voltage dropping circuit according to the fourth embodiment of the present invention. In FIG. 11, the same parts as those shown in FIG. 5 are referred to by the same characters. Also in FIG. 11, DLL circuit 6 and memory array 7 are shown.

The semiconductor device shown in FIG. 11 will be described below, focusing on points that are different from the third embodiment shown in FIG. 5.

First, power supply voltage dropping circuit 1B in the fourth embodiment is different from power supply voltage dropping circuit 1A in the third embodiment in that power supply voltage dropping circuit 1B has voltage dividing circuit 8 connected in parallel to voltage dropping circuit 4.

Voltage dividing circuit 8 divides raised power supply voltage VPP to generate back bias voltage VB that is lower than raised power supply voltage VPP and that is higher than reduced power supply voltage VPPD. Voltage dividing circuit 8 includes resistors 8*a* and 8*b* connected in series. Raised power supply voltage VPP is divided by resistors 8*a* and 8*b*, and back bias voltage VB is generated. Back bias voltage VB can be generally referred to as a seventh bias voltage.

Here, raised power supply voltage VPP will be connected to reduced power supply voltage VPPD and amplifier 5 via resistors 8*a* and 8*b*. Voltage dividing circuit 8 is used only to generate back bias voltage VB, so that high resistance is used in resistors 8*a* and 8*b*. Therefore, the noise in raised power supply voltage VPP is reduced by resistors 8*a* and 8*b*, so that noise is not a problem. Also, even if slight noise propagates to raised power supply voltage VPPD, the noise is reduced by the characteristics of voltage dropping circuit 4, so that noise is not a problem.

In this embodiment, raised power supply voltage VPP is connected to amplifier 5 via resistors 8*a* and 8*b*, but a configuration in which raised power supply voltage VPP is not connected to reduced power supply voltage VPPD and amplifier 5 and is connected to the ground may be used.

Further, power supply voltage dropping circuit 1B in the fourth embodiment is different from power supply voltage dropping circuit 1A in the third embodiment in that back bias voltage VB is supplied as a back bias to Pch transistors 5*a* and 5*b* of amplifier 5.

Figure 12:
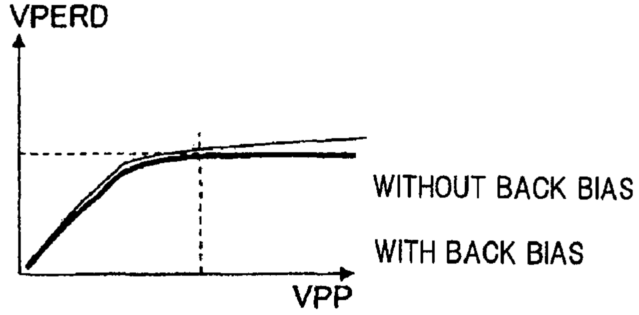
FIG. 12 is an explanatory diagram showing the result of simulating the relationship between external power supply voltage VPP and internal power supply voltage VPERD.

FIG. 12 is an explanatory diagram showing the result of simulating the relationship between external power supply voltage VPP and internal power supply voltage VPERD.

Back bias voltage VB used in this embodiment is lower than raised power supply voltage VPP used as the back bias voltage in the third embodiment.

In the third embodiment, raised power supply voltage VPP is higher than back bias voltage VB, so that the effect of the back bias is strong. Therefore, internal power supply voltage VPERD decreases after saturation.

On the other hand, in this embodiment, back bias voltage VB is lower than raised power supply voltage VPP, weakening the effect of the back bias.

Therefore, a decrease in internal power supply voltage VPERD with an increase in back bias voltage VB is equal to an increase in internal power supply voltage VPERD with an increase in reduced power supply voltage VPPD that is the power supply voltage of amplifier 5. Thus, when internal power supply voltage VPERD reaches a target voltage, little change in internal power supply voltage VPERD occurs even if, subsequently, raised power supply voltage VPP increases. Therefore, internal power supply voltage VPERD is more stable.

It is apparent that the present invention is not limited to the above embodiments, but may be modified and changed without departing from the scope and spirit of the invention.

What is claimed is:

1. A device comprising:

an N-channel transistor for output having one end to which a power supply voltage that is a first voltage is supplied, and having the other end functioning as an output terminal;

a voltage raising circuit which raises the first voltage to generate a second voltage higher than the first voltage;

a voltage dropping circuit which reduces the second voltage to generate a third voltage that is higher than the first voltage and that is lower than the second voltage; and an amplifier which amplifies a difference between a reference voltage and a voltage generated at the output terminal, using the third voltage as a power supply voltage, to generate a fourth voltage to be supplied to a gate of the N-channel transistor for output.

2. The device according to claim 1, wherein the voltage dropping circuit comprises a voltage dropping P-channel transistor having one end to which the second voltage is supplied, and the other end from which the third voltage is output, a generation circuit which divides the third voltage to generate a fifth voltage, and a voltage dropping amplification circuit which amplifies a difference between the reference voltage and the fifth voltage, using the second voltage as a power supply voltage, to generate a sixth voltage to be supplied to a gate of the voltage dropping P-channel transistor.

3. The device according to claim 1, wherein the amplifier comprises a pair of P-channel transistors constituting a current mirror circuit, a pair of N-channel transistors, and a constant current circuit, wherein the third voltage is supplied to respective one ends of the pair of P-channel transistors, wherein respective other ends of the pair of P-channel transistors and respective one ends of the pair of N-channel transistors are connected to each other, wherein the other end of one of the pair of P-channel transistors is connected to the gate of the N-channel transistor for output, wherein a gate of one of the pair of N-channel transistors is connected to the output terminal, and a gate of the other is connected to the reference voltage, and wherein respective other ends of the pair of N-channel transistors are connected to the constant current circuit.

4. The device according to claim 3, wherein the second voltage is supplied as a back bias to the pair of P-channel transistors.

5. The device according to claim 3, comprising a voltage dividing circuit which divides the second voltage to generate a bias voltage that is lower than the second voltage and that is higher than the third voltage, wherein the bias voltage is supplied as a back bias to the pair of P-channel transistors.

6. The device according to claim 1, wherein the voltage at the output terminal of the N-channel transistor for output is supplied to a DLL circuit.

7. The device according to claim 1, wherein the second voltage is used as a raised power supply voltage of a word line.

8. The device according to claim 3, wherein the third voltage is supplied as a back bias to the pair of P-channel transistors.

9. The device according to claim 5, wherein the voltage dividing circuit comprises a resistor configured to generate the bias voltage from the second voltage.

10. A device comprising:

a power line supplied with a first voltage;

a voltage step-up circuit which is coupled to the power line and steps up the first voltage to generate a second voltage that is higher than the first voltage;

a voltage step-down circuit which is coupled to the voltage step-up circuit and steps down the second voltage to generate a third voltage that is higher than the first voltage and lower than the second voltage; and a voltage generation circuit which is supplied with the first and third voltages to generate an output voltage at an output node, the voltage generation circuit comprising a first transistor of a first conductivity type coupled between the power line and the output node, and a first amplifier operating on the third voltage, the first amplifier being coupled to control the first transistor in response to the output voltage and a reference voltage.

11. The device according to claim 10, further comprising a second node to which the second voltage is supplied from the voltage step-up circuit, and a third node to which the third voltage is supplied from the voltage step-down circuit, the third node being coupled to the voltage generation circuit, wherein the step-down circuit is supplied with the second voltage to generate the third voltage at a the third node coupled to the voltage generation circuit, the step-down circuit comprises a second transistor of a second conductivity type coupled between the second node and the third node, and a second amplifier operating on the second voltage, the second amplifier being coupled to control the second transistor in response to the reference voltage and a divided voltage to be generated by a voltage dividing circuit which divides the third voltage.

12. The device according to claim 10, the first amplifier comprises a first pair transistor of the first conductivity type, a second pair transistor of the first conductivity type coupled to the first transistor to form a differential circuit, a third pair transistor of a second conductivity type coupled to the first pair transistor as a load and a fourth pair transistor of the second conductivity type coupled to the second pair transistor as a load.

13. The device according to claim 12, wherein each of the third pair transistor and the fourth pair transistor includes a source supplied with a first bias voltage and a back gate supplied with a second bias voltage that is different from the first bias voltage.

14. The device according to claim 13, wherein the third voltage is employed as the first bias voltage and the second voltage is employed as the second bias voltage.

15. The device according to claim 13, further comprising a voltage dividing circuit which divides the second voltage to generate a fourth voltage that is lower than the second voltage and higher than the third voltage, wherein the third voltage is employed as the first bias voltage and the fourth voltage is employed as the second bias voltage.

16. The device according to claim 10, wherein the output voltage is at the output node is supplied to a DLL circuit.

17. The device according to claim 10, wherein the second voltage is used as a step-up voltage of a word line.

18. The device according to according to claim 12, wherein the third voltage is supplied as a back bias to each of the third pair transistor and the fourth pair transistor.

19. The device according to claim 11, wherein the voltage dividing circuit comprise a resistor configured to generate from the third voltage the divided voltage to be input to the second amplifier.

20. The device according to claim 11, wherein a gate of the first pair transistor is configured so as to receive the reference voltage, a gate of the second pair transistor is connected to the output node, each of drains of the first pair transistor and the second pair transistor is connected respectively to each of drains the third pair transistor and the fourth pair of the transistor, and a gate of the third pair transistor is connected to a gate of the fourth pair transistor.

* * * * *